3,449,395
PREPARATION OF OXYDI(p-PHENYLENE ISOCYANATE)
Theodore E. Majewski and Daniel W. Tarkowski, Midland, Mich., assignors to The Dow Chemical Company, Midland, Mich., a corporation of Delaware
No Drawing. Filed Aug. 4, 1964, Ser. No. 387,482
Int. Cl. C07c *119/04, 93/14;* C08g *22/26*
U.S. Cl. 260—453                                         4 Claims

ABSTRACT OF THE DISCLOSURE

The use of tetrachloroethylene as the reaction solvent in the preparation of oxydi(p-phenylene isocyanate) by the reaction of p-oxydianiline with phosgene results in the product having much less color than when other solvents are used.

---

This invention relates to an improved process for the preparation of oxydi(p-phenylene isocyanate). More particularly, the present invention relates to the manufacture of oxydi(p-phenylene isocyanate) in high yields with improved color characteristics by the reaction of phosgene and p-oxydianiline in the presence of tetrachloroethylene.

The preparation of isocyanates by the reaction of phosgene and a primary amine in chlorinated aromatic solvents such as chlorobenzene is disclosed, for example, by Werner Seifken in Annalen, 562, pages 6–136 (1949) and in U.S. Patent 2,908,703 to Latourette. However, when solvents such as ortho-dichlorobenzene, chlorobenzene, xylene, toluene, dioxane or trichloroethylene are used for the preparation of oxydi(p-phenylene isocyanate) from phosgene and oxydianiline, a product is obtained which requires further purification in order to remove colored contaminants. These colored impurities occur in the final diisocyanate product even if the starting p-oxydianiline reactant has been previously purified (by means of recrystallization or other conventional techniques). In addition, it is often difficult to remove the last traces of some of these solvents from the oxydi(p-phenylene isocyanate).

It has now been found that carrying out the reaction of phosgene and p-oxydianiline in the presence of tetrachloroethylene produces a diisocyanate product which is light enough in color to be employed directly (without further tretament or purification) for the preparation of polymer-based foams and coatings. The process of the present invention thus eliminates any necessity for purifying either the starting p-oxydianiline or the final diisocyanate product and thereby provides a simplified method for manufacturing a product with superior color characteristics. Furthermore, the tetrachloroethylene is easily removed from the final oxydi-(p-phenylene isocyanate) compound.

The process of the invention comprises contacting stoichiometric amounts of p-oxydianiline and phosgene in the presence of tetrachloroethylene ($Cl_2C=CCl_2$) according to the equation:

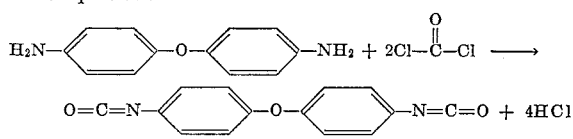

The process can be carried out with pure p-oxydianiline as a starting material or, alternatively, crude p-oxydianiline may be used. For commercial operations, it is preferable to employ the crude p-oxydianiline as a starting material because a process step is eliminated and the cost is lower. By "crude p-oxydianiline" is meant p-oxydianiline which contains colored impurities. Crude p-oxydianiline is generally chocolate brown (or black) in color and may contain from about 70 to 98–99 percent by weight of p-oxydianiline. Crude commercial p-oxydianiline is ordinarily obtained by the amination of a bis(p-halophenyl) ether and often contains o,p-oxydianiline and/or p-phenoxyaniline among the impurities.

In the aforementioned reaction, the ratio of the reactants should be sufficient to provide two molecules of phosgene for every molecule of p-oxydianiline that reacts. Mole ratios (phosgene:pure p-oxydianiline) of at least 2:1 may be used with ratios of from about 2.5:1 to 5:1 being preferred. The use of excess phosgene (ordinarily bubbled through the reaction mixture) is not detrimental to the reaction. The concentration of phosgene in the reaction mixture is regulated by the temperature being employed for the reaction. Preferably, an essentially saturated solution of phosgene in the solvent should be maintained during the reaction. Low concentrations of phosgene usually lower the yields obtained due to the formation of side products. The reaction may be carried out at temperatures of from about 75–85° C. up to the reflux temperature of the mixture (about 121° C.). The amount of tetrachloroethylene solvent used should be sufficient to maintain the reaction mixture in a fluid state (an approximate Brookfield viscosity of 7,000 to 11,400 cps. at 25° C. represents a slurry which is stirrable) at the reaction temperatures used. Ordinarily, at least ten moles of tetrachloroethylene per mole of p-oxydianiline are used. Mole ratios of from 20:1 to 100:1 (tetrachloroethylene:p-oxydianiline) are preferred. More solvent may be used without adversely affecting the color of the product, however, no additional color improvement was obtained by the use of large amounts of solvent. The solvent is removed by evaporation (preferably vacuum distillation) after completion of the reaction.

The following examples are submitted for the purpose of illustration only and are not to be construed as limiting the scope of the invention in any way.

EXAMPLE I

Into a mixture of 33.2 grams (0.166 mole) of chocolate brown colored crude p-oxydianiline (90–92 percent pure p-oxydianiline) in 1000 milliliters of tetrachloroethylene was bubbled 69.0 grams (0.7 mole) of phosgene. After the $COCl_2$ was added, the mixture was heated over a half hour period to 80°–85° C. and held there for 2 hours. It was then heated to reflux (about 122° C.) over a 30–45 minute period and held there for 1–2 hours. The mixture was cooled to room temperature while passing nitrogen through the solution (to remove HCl and unreacted phosgene). The solids present were removed by filtration and the filtrate distilled reduced pressure (about 40° C. at 39 mm. pressure). The temperature of the reactor was allowed to rise to 150° C to help remove the last traces of solvent. The weight of crude oxydi(p-phenylene isocyanate) obtained was 37.3 grams (89.0 percent yield). The diisocyanate content of the product was 93.3 percent of theory. The color was light gray to light tan and the product was suitable for direct use in preparing polyurethane foams. A one gram sample (dissolved in 10 milliliters of dioxane) gave an A.S.T.M. color standard number of 350. The color comparisons were made against platinum-cobalt reference standards prepared in accordance with A.S.T.M. D 1209–62. Instead of using Nessler tubes, color comparisons were carried out with a Klett-Summerson Photoelectric Colorimeter using a number 42 blue filter and a cell with a 40 millimeter path. The color standards were identical wtih the standards of A.S.T.M. D 1209–62 and the color standard number obtained by this method is the same as that obtained by the A.S.T.M. method.

EXAMPLE II

Using the same amounts of reactants and identical reaction conditions as in Example I, but with only 500 milliliters of tetrachloroethylene, the yield of oxydi(p-phenylene isocyanate) was 69.0 percent of theory when the reaction was carried out for the same period of time as in Example I. The color of the product was the same as that obtained in Example I.

EXAMPLE III

To 33.2 grams (0.166 mole) of pure oxydianiline (melting point: 190°–192° C.) in 1000 milliliters of tetrachloroethylene was added 69.0 grams (0.7 mole) of phosgene. The temperature rose to about 35° C. during the addition of phosgene. The mixture was then heated to 80°–85° C. for one hour before heating to reflux (122° C.) where the mixture was held for 2 hours. While passing through a stream of dry nitrogen, the mixture was cooled to room temperature and filtered. The filtrate was colorless. The solvent was stripped from the filtrate at 39°–40° C. (38 mm.). The distillation flask was heated to a final temperature of 140° C. at 38 mm. to get rid of residual solvent. The weight of the oxydi(p-phenylene isocyanate was 32.4 grams (76.7 percent of theory). The A.S.T.M. color standard number (determined according to the procedure of Example I using a one gram sample in 10 milliliters of dioxane) was 45. The solution of oxydi(p-phenylene isocyanate) in dioxane was practically colorless.

EXAMPLE IV

To 33.2 grams (0.166 mole) of pure oxydianiline (melting point: 190°–192° C.) in 1000 milliliters of chlorobenzene was added 69.0 grams (0.7 mole) of phosgene. The temperature rose to 35° C. during the addition of phosgene. The mixture was then heated to 80°–85° C. for one hour before heating to reflux (133° C.) where it was held for two hours. The mixture was cooled to room temperature while passing dry nitrogen through the mixture to sweep out any unreacted phosgene or residual hydrogen chloride. After filtering off the solids, a yellowish filtrate remained which was distilled at 40° C. (25 mm.). The final temperature of the distillation pot was raised to 140° C. at 25 mm. to eliminate residual chlorobenzene. The weight of the oxydi(p-phenylene isocyanate) product was 33.1 grams (78.4 percent yield). The A.S.T.M. color standard number (determined according to the procedure of Example I) was 476. This result indicates that colored impurities are produced when chlorobenzene is used as the reaction medium.

We claim as our invention:

1. In a method of preparing oxydi(p-phenylene isocyanate) by the reaction of p-oxydianiline with phosgene in an organic solvent, the improvement comprising using tetrachloroethylene as the solvent.
2. The method of claim 1 wherein the mole ratio of tetrachloroethylene to p-oxydianiline is at least 10:1.
3. The mehtod of claim 1 wherein the reaction is carried out at a temperature of from 75° to 122° C. and wherein the mole ratio of tetarachloroethyelne to p-oxydianiline is from 20:1 to 100:1.
4. The process of claim 3 wherein the p-oxydianiline is of 70–95% purity and contains colored impurities.

References Cited

UNITED STATES PATENTS

| | | | |
|---|---|---|---|
| 2,908,704 | 10/1959 | Skiles | 260—453 |
| 3,222,386 | 12/1965 | Cleveland | 260—453 |
| 3,206,437 | 9/1965 | Cooper et al. | 260—453 X |
| 3,225,094 | 12/1965 | Wolf | 260—453 X |

CHARLES B. PARKER, *Primary Examiner.*

D. H. TORRENCE, *Assistnat Examiner.*

U.S. Cl. X.R.

260—2.5, 77.5, 571